April 26, 1955     L. E. FROST ET AL     2,706,832

THIN SHELL DIES AND METHOD OF MAKING SAME

Filed Aug. 23, 1951

INVENTORS
GEORGE B. LEWIS
LOUIS E. FROST
BY

*William R. Lane*

ATTORNEY

United States Patent Office 2,706,832
Patented Apr. 26, 1955

2,706,832

THIN SHELL DIES AND METHOD OF MAKING SAME

Louis E. Frost, Los Angeles, and George B. Lewis, Venice, Calif., assignors to North American Aviation, Inc.

Application August 23, 1951, Serial No. 243,296

7 Claims. (Cl. 18—38)

This invention relates to dies and more particularly to thin shell dies of a plastic material.

An object of this invention is to provide a die that can be made by an economical and simple method.

Another object of this invention is to provide a die that is exact in contour.

An additional object of this invention is to provide a die that can be quickly made and that requires no finishing operation.

Still another object of this invention is to provide a die that is light in weight and may be easily repaired.

A still further object of this invention is to provide a die that may be heated and will provide a uniform heat distribution throughout the die.

These and other objects of this invention will become apparent from the following description taken in connection with the accompanying drawing in which.

Figure 1:
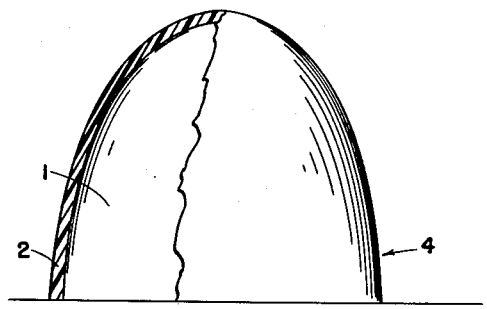
Fig. 1 is an elevation, partly in section, of a die incorporating the teachings of this invention while the die is on a form.
Figure 2:
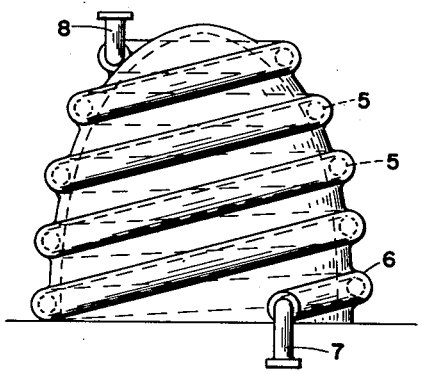
Fig. 2 is an elevation of a die provided with tubing around its outer surface.
Figure 3:
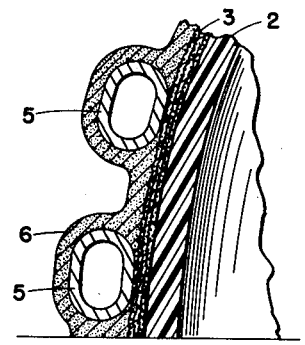
Fig. 3 is an enlarged, fragmentary sectional view of the die illustrated in Fig. 2.
Figure 4:
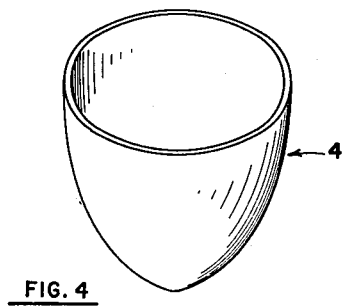
Fig. 4 is a perspective view of a completed die inverted from the position illustrated in Figs. 1–3.

To produce the thin shell die by this method a plaster form or matrix 1 is first prepared. This may be a female member for producing a male die but is preferably a male member for use in making a female die. Any suitable material may be used for the matrix, plaster having been found most satisfactory. Matrix 1 is prepared to conform to the exact contour of the configuration forming surface of the die to be produced. Normally it is desirable to make a die quite smooth in contour and the plaster form should accordingly present a smooth exterior surface. After the form has been smoothed as desired, a parting agent is applied which may comprise a lacquer coated with wax and given a high polish.

A liquid plastic material is then poured over matrix 1 beginning at the highest point of the matrix. A layer 2 of the plastic is thus provided over the plaster matrix, it being important that the plastic is of such a viscosity at the time of the pouring that it will cling to the matrix yet cover it entirely. If the plastic is not as thick as desired, it may be allowed to gel sufficiently to obtain the proper viscosity. It is generally desirable to pour additional plastic over the matrix, three pourings being the usual number which will build up approximately ¼ of an inch of plastic over the mold. The plastic on the matrix should then be allowed to gel so as to present a solid surface which, in the case of phenolic resin, requires 8 to 12 hours at room temperature.

Several varieties of plastics may be used for pouring over the matrix but certain characteristics are very desirable. The plastic should be of the thermosetting type and resistant to high temperature when in use as a die. In addition, the plastic should contain only a minimum of volatile ingredients that will tend to escape from the die under high temperatures and might damage the smooth configuration forming surface of the die. The material should also exhibit low shrinkage during curing of the die and during subsequent use of the die so that close tolerances may be held. Certain castable phenolic resins exhibit these properties, several of which are commercially available, an example being Rezolin No. 72S, produced by Rezolin, Inc. of Los Angeles, California. A suitable filler to decrease shrinkage of the plastic, and a catalyst to aid its curing, should be added.

After the layers of plastic have been applied to matrix 1 to form homogeneous lamina 2 it may be desirable to provide a reinforcement for the die. This may be accomplished by first brushing or otherwise applying an additional coating of plastic over the lamina and then applying a reinforcing material 3 to the wet plastic. This reinforcing material should provide strength when surrounded by plastic material and is preferably flexible so that it may be easily associated with the exterior of the lamina. An additional function may be provided by the reinforcement in acting as a channel for the volatile elements of the plastic material, serving to guide these elements to the outer surface of the die rather than to the smooth inner surface. In order to provide such a channel, the reinforcement should be fibrous or porous so as to provide an outlet for the volatile elements. A fabric material is particularly desirable for such a purpose, and a loosely woven glass cloth has been found to exhibit good strength characteristics as well as providing a channel for volatile elements of the plastic.

In most cases it is desirable to provide successive coats of liquid plastic and glass cloth to obtain sufficient reinforcement for the die, four layers having been found satisfactory. A gelation period of about 10 to 12 hours should be allowed when phenolic resin is used so that the cloth will be firmly attached to the resin and so that plastic will not run off the die during subsequent oven curing.

The die should then be cured which is normally accomplished by placing the unit inside an oven where it is subjected to heat which effects the curing operation. It is also possible to cure the die at room temperature by using only a catalytic reaction in solidifying the plastic. In such cases the plastic should, of course, contain greater quantities of catalyst than when the curing is provided by heat. When the curing operation has been completed, the excess plastic may be ground off at the plaster edge and the completed die 4 released from the form.

In many instances it is desirable to provide a die that can be heated while it is being used in forming a part. In such cases tubing 5 may be closely associated with the exterior of die 4. This tubing is preferably flexible and wrapped around the die in a generally spiral fashion. A mastic 6 is then prepared comprising a suitable plastic material, such as polyester resin, together with a metallic powder or dust. Mastic 6 is of a paste-like consistency and is spread by hand or by any suitable means over the outside of die 4 and tubing 5. This mastic will serve to hold the tubing to the die and may be allowed to set up to a solid consistency at room temperature or may be placed in an oven for a curing operation if desired. A plastic bonded metallic powder is thus provided over the entire exterior surface of the die. When the die is in use a heated fluid such as water or steam may be admitted through inlet fitting 7, circulated through tubing 5 for heating the inner surface of the die and removed through outlet fitting 8. The metallic dust in the mastic will act as a heat conductor and assure a uniform heat distribution throughout the die. This dust should therefore be of copper, aluminum or some other highly heat conductive material. Curing of the mastic may also be obtained by circulating a hot fluid through tubing 5. If so desired, tubing may be applied by means of this mastic to a die made of metal or other material.

In some cases it may be desirable to coat the tubing and the exterior of the die with a mastic containing a plastic that requires heat for its curing and consists of about 80% metallic powder, and then applying a thin layer of mastic containing a cold cure catalyzed plastic and a lesser quantity of metallic dust on top of the first coating of mastic. The top coating will solidify at room temperature and hold the bottom coating of mastic in place until heat can be applied to cure the bottom layer of mastic. Complete coverage of the die can be obtained in this manner because the bottom layer of mastic can be carefully applied over the entire surface of the die, including the crevices around tubing 5, without danger of premature solidification such as might occur with a cold cure plastic.

The resulting die is light and strong and may be produced with a fraction of the labor cost required for producing conventional dies. An exact reproduction of the plaster mold will always be obtained.

If the die should be broken at any time, it may be easily repaired by cutting out a V-notch along the line of the break and subsequently filling the notch with a catalized plastic. It will be necessary to smooth off the interior of the die after this repair. If the break is severe, reinforcing layers of plastic and glass cloth may be applied to the outside of the die.

It should be clearly understood that the foregoing detailed description is to be taken by way of illustration only and not to be taken by way of limitation, the spirit and scope of this invention being limited only by the appended claims.

We claim:

1. The method of producing a die comprising the steps of pouring a liquid plastic material over a form member thereby to provide a coating of said plastic thereon, applying additional layers of plastic and reinforcing material to said coating, closely associating tubing with the exterior of the resulting die, attaching said tubing thereto by means of a mastic comprised of a metallic dust and a plastic material, curing said die, and separating said die from said form.

2. The method of producing a die comprising the steps of poring a liquid resinous material over a plaster form to provide a coating thereon, applying successive layers of resin and glass fiber material, wrapping a hollow tube closely around the exterior of the resulting die to provide a means for heating said die, attaching said tube to said die by means of a mastic comprised of a metallic dust and a plastic in paste form, allowing said mastic to solidify, curing the resulting die, and separating said die from said form.

3. The method of producing a die comprising the steps of pouring liquid phenolic resin over the highest portion of a male plaster form, said resin being of such consistency that it will flow over the entire surface of said form yet adhere thereto so as to provide a thin layer of said resin thereon having an interior contour corresponding to the contour of said form, allowing said resin to solidify, applying successive layers of said resin and glass cloth, allowing said last mentioned layers of resin to solidify, spirally wrapping a tube around the exterior surface of the resulting die, placing a mastic comprising copper dust and polyester resin over said tube and said exterior surface, allowing said mastic to solidify thereby to attach said tube to said die and to provide a means for distributing heat to said die from said tube, subjecting said die to a curing heat, and separating said die from said form.

4. A die comprising a configuration forming plastic lamina, tubing associated with the exterior of said lamina, and means for attaching said tubing to said lamina, said means comprising a mastic of a plastic material and metallic dust disposed over said tubing and said lamina to thereby attach said tubing to said lamina.

5. A die comprising a reinforced plastic lamina having a configuration forming surface, tubing adjacent the opposite surface of said lamina, and means for attaching said tubing to said lamina and providing a heat conductive medium therebetween, said means comprising a plastic bonded metallic powder disposed over said tubing and said opposite surface.

6. A die comprising a lamina of plastic material one side of which includes a configuration forming surface, and the other side of which includes reinforcing layers of glass cloth, a hollow tube wound around said lamina in close association with said opposite side, and attaching means for maintaining said tube in such positon, said attaching means comprising a mastic of plastic and metallic dust disposed over said tube and said opposite side.

7. A device as recited in claim 6 in which said lamina is comprised of phenolic resin and said plastic portion of said mastic is comprised of polyester resin.

References Cited in the file of this patent

UNITED STATES PATENTS

| | | |
|---|---|---|
| 1,834,763 | Bonsieur | Dec. 1, 1931 |
| 1,913,747 | Copeman | June 13, 1933 |
| 2,110,565 | Yeager | Mar. 8, 1938 |
| 2,147,218 | Reimel | Feb. 14, 1939 |
| 2,282,627 | Weiss | May 12, 1942 |
| 2,324,990 | Carter | July 20, 1943 |
| 2,337,036 | Erdle | Dec. 21, 1943 |
| 2,345,939 | Leary | Apr. 4, 1944 |
| 2,415,788 | Champer | Feb. 11, 1947 |
| 2,441,548 | Sperry | May 11, 1948 |
| 2,504,845 | Keyes | Apr. 18, 1950 |
| 2,579,898 | Brucker | Dec. 25, 1951 |
| 2,606,574 | Lefebvre | Aug. 12, 1952 |

OTHER REFERENCES

"Plastics Industry," February 1950, pages 26, 27 and 32.